United States Patent
Versaci

[15] 3,650,404
[45] Mar. 21, 1972

[54] DISPOSABLE DIALYSIS APPARATUS
[72] Inventor: Antonio A. Versaci, 650 Franklin St., Schenectady, N.Y. 12305
[22] Filed: Feb. 27, 1970
[21] Appl. No.: 15,155

[52] U.S. Cl. ............................................. 210/238, 210/321
[51] Int. Cl. ....................................................... B01d 31/00
[58] Field of Search ................................... 210/238, 22, 321

[56] References Cited

UNITED STATES PATENTS

| | | | |
|---|---|---|---|
| 3,489,647 | 1/1970 | Kolobow | 210/22 X |
| 3,077,268 | 2/1963 | Gobel et al. | 210/321 |
| 2,880,501 | 4/1959 | Metz | 210/321 X |
| 3,508,662 | 4/1970 | Miller | 210/321 |

OTHER PUBLICATIONS

Artificial Kidneys, by Travenol Laboratories, Inc., 20 pages, pp. K15 & K16 relied on, 9-30-67

Primary Examiner—Frank A. Spear, Jr.
Attorney—Hofgren, Wegner, Allen, Stellman & McCord

[57] ABSTRACT

A dialysis device that is adapted to be disposed of after a single use. A closed cell foam core is used as a support for a dialysis membrane and may be located in a chamber associated with a reservoir also of closed cell foam, with the core occupying a major portion of the chamber. A pump circulates dialyzing fluid from the reservoir to the chamber from which the fluid overflows back into the reservoir. The use of a foam core and reservoir permits the structure to be fabricated sufficiently economically to permit it to be disposed of after a single use and the use of a closed cell structure occupying a major portion of the chamber minimizes the amount of dialyzing fluid required to perform a dialysis operation.

8 Claims, 7 Drawing Figures

INVENTOR
Antonio A. Versaci
BY Hofgren, Wegner, Allen, Stellman & Cord
ATTORNEYS

DISPOSABLE DIALYSIS APPARATUS

BACKGROUND OF THE INVENTION

Dialysis equipment has, in recent years seen increasing use of a variety of operations, particularly in the medical field. Heretofore, a tubular membrane receiving the fluid to be subjected to the dialyzing operation has been wrapped about a cylindrical support having an open center. Such constructions have contributed to the high cost of dialyzing operations in that the open center is occupied by a substantial quantity of dialysis fluid which serves no practical function.

Furthermore, such a construction is expensive to make.

As a result of both of the foregoing considerations, dialysis operations, such as the subjecting of a patient's blood to dialysis in which the dialyzing apparatus acts as a so-called "artificial kidney," have been extremely expensive and the high cost mitigates against the extensive use of such devices.

Another factor that tends to limit the extensive use of dialyzing apparatus as artificial kidneys is the large size of such apparatus and the care required to maintain the same in good condition commensurate with the life perpetuating function it performs. Following each use of the apparatus it must be cleaned and sterilized.

SUMMARY OF THE INVENTION

The principal object of the invention is to provide a new and improved dialyzing apparatus that may be fabricated inexpensively, is not costly to operate, is easily transported from one location to another and requires a minimum of maintenance.

The foregoing objects are achieved by the invention through the use of a membrane supporting core formed of a closed cell foam. In the exemplary embodiment, the core is generally cylindrical in shape and, at its upper end, includes a recess which is partially covered by an elongated handle means. At the bottom of the core, there are downwardly extending legs which serve to space the core and the membrane supported thereby above the bottom of a chamber through which dialyzing fluid is circulated.

Additionally, on the sides of the core, there are provided a pair of grooves which extend to one end of the core and which have their other ends terminating in tapered blends to the cylindrical surface of the core. Conduit means for the fluid to be subjected to dialysis are received in the grooves and are connected, at the tapered blends, to a dialyzing membrane wrapped around the cylindrical surface of the core.

The foregoing core construction provides a number of advantages. When the core is sized according to the invention to occupy a major portion of the chamber which receives the dialyzing fluid, the volume of the core significantly, reduces the amount of dialyzing fluid required. Similarly, because of the substantial void space provided by the foam, the entire membrane structure including the supporting core is extremely lightweight and may be easily transported. Finally, the use of a foam in forming a core permits the same to be fabricated relatively inexpensively.

The core may be received in a chamber associated with a reservoir formed of a closed cell foam for dialyzing fluid and which is adapted to overflow into the reservoir. A pump circulates dialyzing fluid from the reservoir upwardly into the chamber and, accordingly, to the membrane supported on the core. The dialyzing fluid overflows from the chamber back into the reservoir to be recirculated. When the dialyzing operation is finished, because of the inexpensive nature of the membrane structure, the same merely may be thrown away after one use eliminating any need for cleaning the apparatus. As a result, maintenance is significantly reduced, it only being necessary to maintain the pump clean and in good repair and to provide a suitable source of fresh dialyzing fluid.

Other objects and advantages of the invention will become apparent from the following specification taken in conjunction with the accompanying drawings.

DESCRIPTION OF THE PREFERRED EMBODIMENT

Figure 1:
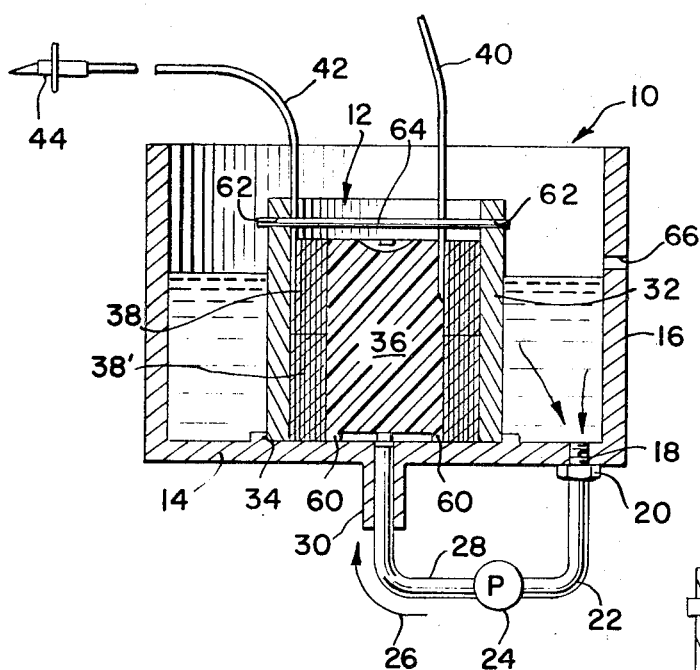
FIG. 1 is a vertical section of a dialyzing apparatus made according to the invention.
Figure 2:
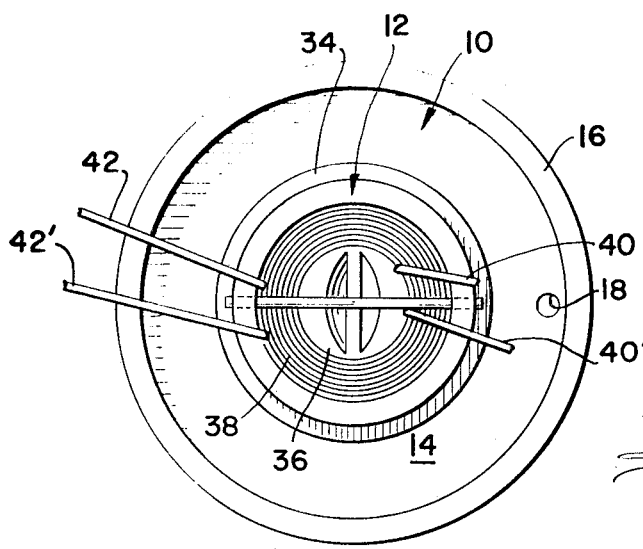
FIG. 2 is a plan view of the dialyzing apparatus.

An exemplary embodiment of a dialyzing apparatus made according to the invention is illustrated in FIGS. 1 and 2 and is seen to comprise a reservoir, generally designated 10, which may be formed of a closed cell foam and includes a central chamber, generally designated 12, centrally located therein and from which dialyzing fluid may spill or overflow into the reservoir 10. The reservoir 10 includes a bottom wall 14 and a generally cylindrical upstanding side wall 16. At one point, the bottom wall 14 includes an aperture 18 which may receive a fitting 20 (FIG. 1) which is connected to a recirculating line 22. A pump 24 in the recirculating line pumps dialyzing fluid from the reservoir 10 in the direction of an arrow 26 to the chamber 12 at the bottom thereof through a line 28 which passes into a tubular neck 30 in the bottom of the base 14.

In the embodiment illustrated in FIGS. 1 and 2, the chamber 12 is formed by a cylindrical sleeve 32 which is centrally located within the reservoir 10 by means of an upwardly projecting ring-shaped flange 34 on the bottom wall 14. Within the sleeve 13 there is located a membrane support core 36 having two dialyzing membranes 38 and 38' wrapped therearound. As is known in the art, the dialyzing membranes 38 and 38' are formed in the shape of tubes and each has its ends connected to conduit means 40 and 42 and 40' and 42' respectively which may be connected to a source of fluid to be dialyzed. When the device is utilized as an artificial kidney, four of cannulae 44 (only one of which is shown) may be associated with the conduits 40 and 42 and 40' and 42'.

The core 36 occupies a major portion of the chamber 12 defined by the sleeve 32 and the bottom wall 14 of the reservoir. Preferably, the same is made light in weight and liquid impervious and to this end, it is preferable that a closed cell foam be employed. One suitable foam that may be utilized is styrofoam.

The core construction just described provides the advantage of lightweight and therefore is easily transported; is liquid impervious and therefore eliminates a considerable quantity of dialyzing fluid required by occupying a major portion of the volume of the chamber defined by the sleeve 32; and is relatively inexpensive to fabricate thereby providing the advantage of disposability.

Figure 3:
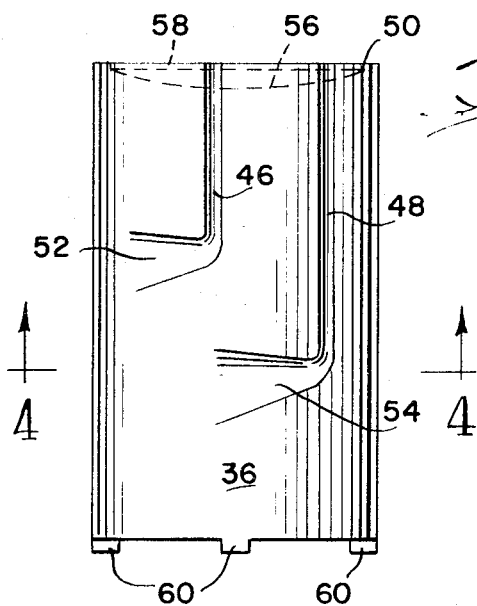
FIG. 3 is a side elevation of a membrane support core employed in the invention.
Figure 4:
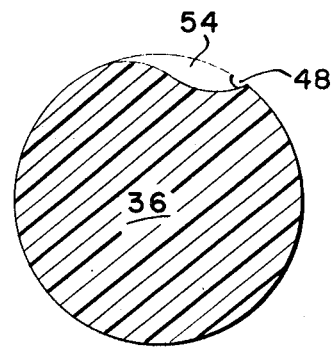
FIG. 4 is a horizontal section taken approximately along the line 4—4 of FIG. 3.

Turning now to FIGS. 3 through 6, inclusive, the nature of the core 36 in terms of its structural characteristic will be described. The core 36 is cylindrical in shape and, as best seen in FIG. 3, includes a pair of grooves 46 and 48 which extend to the upper end 50 of the core 36. The grooves 46 and 48 may receive the conduits 40 and 40' respectively and, at their lower ends, include tapered blends 52 and 54 which blend into the cylindrical surface of the core 36. The tapered blend 54 may also be seen in FIG. 4.

The pair of tubular membranes 38 and 38' may each have one end connected to the respective conduit means 40 and 40' at the tapered blends 52 and 54 respectively by any suitable connection known in the art. From that point, the tubular membranes 38 and 38', which may be formed of any known material suitable for the dialyzing operation to be performed by the apparatus, are wrapped about the upper and lower portion of the cylindrical surface of the core 36, generally in a plurality of layers as best illustrated in FIGS. 1 and 2. Of course, any suitable form of porous spacers may be employed between the layers to facilitate circulation of the dialyzing fluid about the membranes 38 and 38'.

Figure 5:
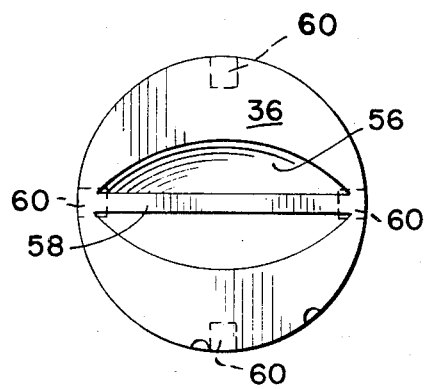
FIG. 5 is a plan view of the core.

As best seen in FIGS. 3 and 5, the upper end of the core 36 includes a recess 56 which, in plan view, is basically oval shaped. The recess 56 is partially covered by an elongated handle member 58 which is integrally formed with the core 36. Thus, to transport the core 36 and the membranes 38 and 38' supported thereon, it is only necessary for a person to insert his fingers into the recess and under the handle member 58 to lift the same and carry it to a location of proposed use.

Figure 6:
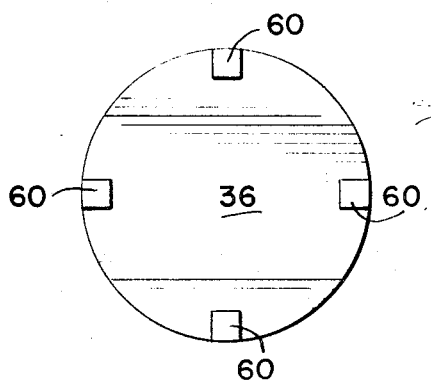
FIG. 6 is a bottom view of the core.

The lower end of the core 36 terminates in downwardly extending spacers or legs which may be viewed in FIGS. 3, 5 or 6. The legs 60, like the handle 58, may be integrally formed on the core 36.

Returning now to FIG. 1, it will be seen that the legs 60 serve to maintain the core 36 just above the bottom 14 of the chamber defined by the cylindrical sleeve 32 so as to permit dialyzing fluid from the line 28 to enter the chamber 12. Thereafter, such fluid will pass through the spaces between the legs 60 and upwardly to contact the membrane 38, performing the dialyzing operation.

Because the core 36 is formed of a closed celled foam, it may have substantial buoyancy. Therefore, in order to maintain the core fully immersed within the dialyzing liquid, the upper end of the cylindrical sleeve 32 has a pair of apertures 62 which are located at diametrically opposite points. A rod 64 extends through the apertures 62 and overlies the core 36 to hold it down.

Finally, if desired, the reservoir 10 may be provided with an overflow opening 66 in the upstanding wall 16.

Figure 7:
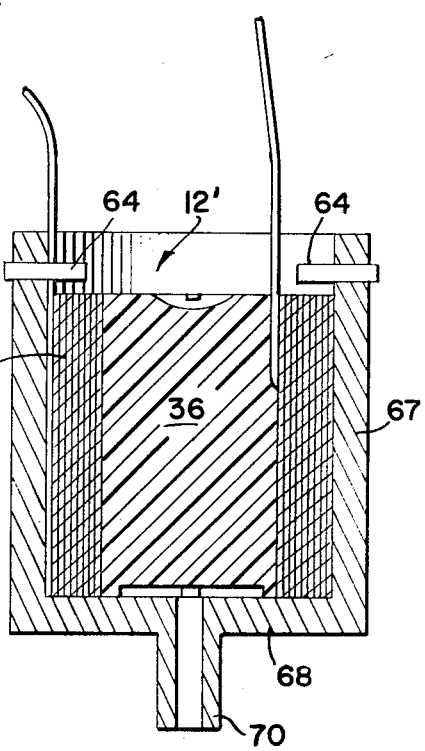
FIG. 7 is a vertical section of a modified embodiment of the invention.

A modified embodiment of the invention is illustrated in FIG. 7. In this case, the core 36 and the appurtenances thereto mentioned previously as well as the membranes 38 and 38' are also employed. Similarly, the rod 64 (shown as two separate rods) may also be employed. However, in lieu of the cylindrical sleeve 32 to define the chamber 12, a chamber 12' is defined by a cylindrical structure 67 formed of closed cell foam and having an integral bottom wall 68. A tubular neck 70 is centrally located depending from the bottom wall 68 and serves the same function as the neck 30 illustrated in FIG. 1.

The just described construction can be employed with the reservoir along the general lines of that illustrated in FIG. 1 with a suitable seal (not shown) to preclude leakage. Alternatively, the structure shown in FIG. 7 could be mounted above the reservoir to operate without such a seal. One advantage produced by the structure in FIG. 7 is that the chamber defined by the bottom wall 68 and the upstanding side wall 67 may serve as a shipping container for the core 36 and the membrane 38 mounted thereon. Of course, the cylindrical sleeve 30 may serve the same purpose but the structure illustrated in FIG. 7 provides some advantage in that the bottom wall 68 serves as a readymade protector for one end of the core and membrane structure.

From the foregoing, it will be appreciated that a dialyzing apparatus made according to the invention overcomes many of the disadvantages present in the prior art constructions by allowing economical fabrication, minimization of fluid requirements, and permitting disposal after a single use thereby avoiding the necessity of cleaning the same.

I claim:

1. In a dialyzing apparatus, the combination comprising an assembly including a lightweight core formed of a closed cell foam so as to have a substantial closed void space and a tubular dialyzing membrane wrapped about and supported by said core with the ends of said membrane terminating in conduit means for receiving and returning fluid to be subject to dialysis to and from a source of such fluid, said assembly being adapted to be received in a reservoir containing dialyzing fluid and to have the dialyzing fluid circulated about the membrane with the core occupying a substantial portion of the reservoir to minimize the quantity of dialyzing fluid required and to provide a disposable, portable dialyzing apparatus.

2. A dialyzing apparatus according to claim 1 wherein the bottom of said core terminates in integral downwardly extending legs adapted to space said core above the bottom of a chamber containing a dialyzing fluid.

3. A dialyzing apparatus according to claim 1 wherein said core is generally cylindrical in shape and includes a pair of grooves in its cylindrical surface extending along the same to one end thereof, one end of each of said grooves terminating in a tapered blend into said cylindrical surface, said conduit means being received in said grooves and being connected to the ends of said membrane at said tapered blends, said membrane being wrapped about said cylindrical surface.

4. A dialyzing apparatus according to claim 1 wherein said core is generally cylindrical in shape, the bottom of said core terminating in downwardly extending legs adapted to space said core above the bottom of a chamber containing a dialyzing fluid, said core further including a recess in its upper end partially covered by an elongated handle member and further having a pair of grooves in its cylindrical surface extending along the same to said upper end, the lower end of each of said grooves terminating in a tapered blend into said cylindrical surface, said conduit means being received in said grooves and being connected to the ends of said membrane at said tapered ends, said membrane being wrapped about said cylindrical surface.

5. Dialyzing apparatus comprising:
   a reservoir for holding a dialyzing fluid,
   a chamber within said reservoir and defined by a portion of the bottom wall of the reservoir and an upstanding sleeve and adapted to permit a dialyzing fluid to overflow into said reservoir,
   a core within said chamber,
   a dialyzing membrane supported by said core within said chamber,
   conduit means associated with said membrane for passing a fluid to be subjected to dialysis to and from said membrane, and
   pump means for circulating a dialyzing fluid from said reservoir to said chamber and said membrane therein.

6. A dialyzing apparatus according to claim 5 wherein said core is formed of a closed cell foam and occupies a major portion of said chamber.

7. A dialyzing apparatus according to claim 9 wherein said core includes spacer means at its lower end to space said core and the membrane supported thereby above the bottom of said chamber, pump means operative to introduce dialyzing fluid into said chamber from the bottom thereof, and handle means formed on the top of said core.

8. Dialyzing apparatus according to claim 5 further including a fluid inlet in said portion of the bottom wall of said reservoir, and a fluid outlet in another portion of the bottom wall of the reservoir, said pump means being interposed in a fluid line between said inlet and said outlet; said reservoir further including a fluid overflow outlet above the bottom thereof.

* * * * *